United States Patent
Skyba

[11] Patent Number: 5,368,281
[45] Date of Patent: Nov. 29, 1994

[54] RATCHET PULLEY FOR TIGHTENING CORDS OR ROPES

[76] Inventor: Helmut K. Skyba, Rte. 2, Box 330, Wild Rose, Wis. 54984

[21] Appl. No.: 382

[22] Filed: Jan. 4, 1993

Related U.S. Application Data

[63] Continuation-in-part of Ser. No. 743,192, Aug. 9, 1991, abandoned.

[51] Int. Cl.⁵ .......................... B66D 3/08; B25B 25/00
[52] U.S. Cl. ................... 254/391; 254/411; 254/223; 254/217
[58] Field of Search ............... 254/391, 371, 374, 369, 254/376, 352, 217, 383, 403, 411, 223; 474/175

[56] References Cited

U.S. PATENT DOCUMENTS

| | | | |
|---|---|---|---|
| 1,185,179 | 5/1916 | Chattaway | 254/411 |
| 1,636,273 | 9/1927 | Baker | 254/391 |
| 2,967,046 | 1/1961 | Ratcliff | 254/376 X |
| 3,302,932 | 2/1967 | Wallin | 254/371 X |
| 3,946,989 | 3/1976 | Tsuda | 254/391 X |
| 4,151,980 | 5/1979 | Burton et al. | 254/371 |
| 4,542,883 | 9/1985 | Rutzki | 254/369 X |
| 4,580,766 | 4/1986 | Woodgate | 254/371 |
| 4,603,839 | 8/1986 | Ekman et al. | 254/371 X |

FOREIGN PATENT DOCUMENTS

| | | | |
|---|---|---|---|
| 197810 | 10/1978 | Germany | 474/175 |
| 901545 | 7/1962 | United Kingdom | 254/391 |
| 2255763 | 11/1992 | United Kingdom | 254/371 |

*Primary Examiner*—Daniel P. Stodola
*Assistant Examiner*—Michael R. Mansen
*Attorney, Agent, or Firm*—Ryan, Kees & Hohenfeldt

[57] ABSTRACT

A ratchet-type tensioning mechanism for a rope or cord has a rotatable sheave with faces having radially extending serrations. A releasable ratchet mechanism permits rotation of the sheave in one direction but not the other. A plurality of serrations circumscribes the sheave, which is closely fitted within a curved surface within a housing within which the sheave is rotatably mounted. The curved surface forces the rope into the sheave and maintains it in non-slippiong contact therewith. An opening in the side of the housing can be provided to permit hand rotation of the sheave. The device optionally may include a ratcheting lever arm which engages the wheel and affords leveraged tensioning the rope.

9 Claims, 3 Drawing Sheets

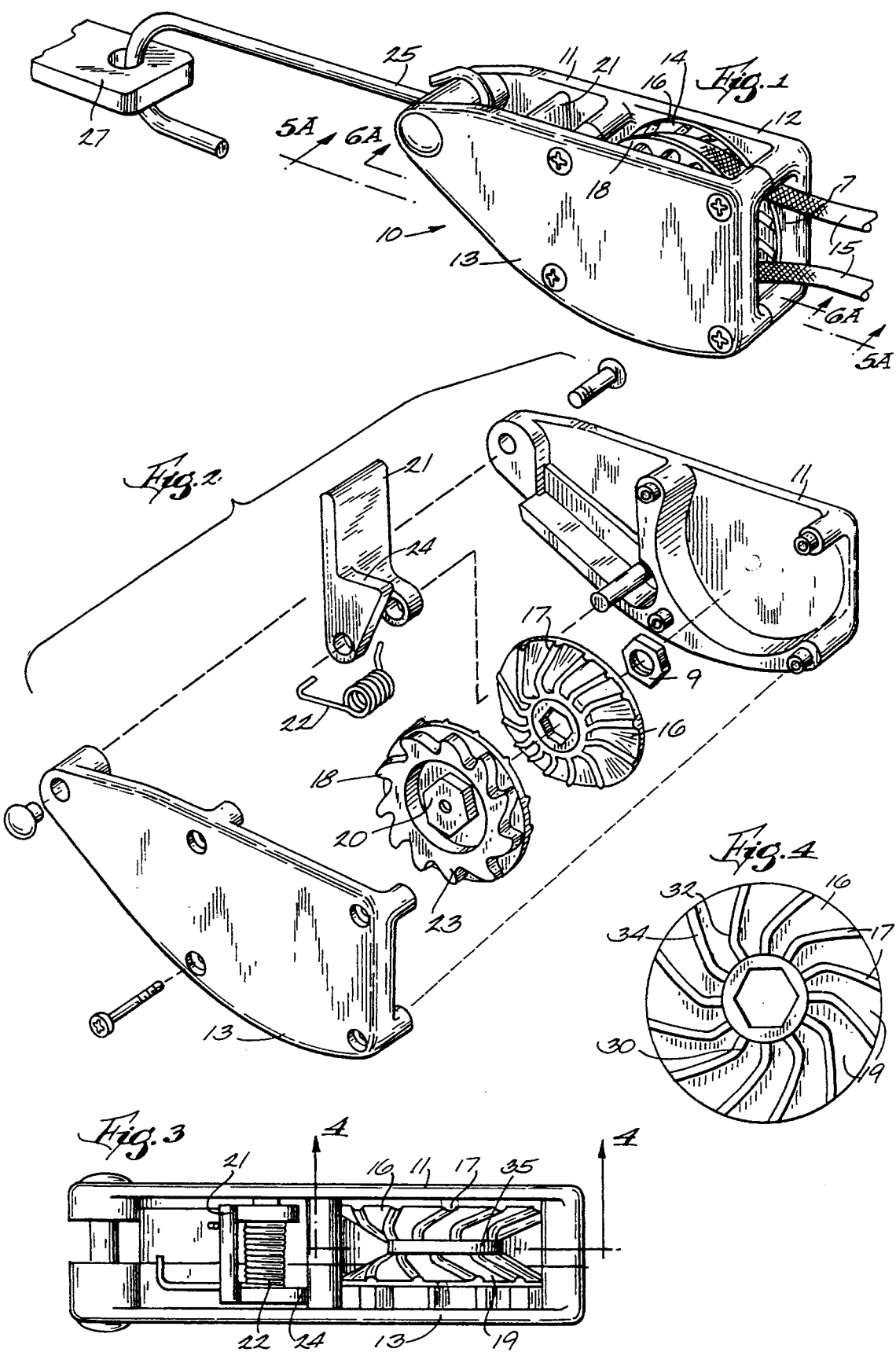

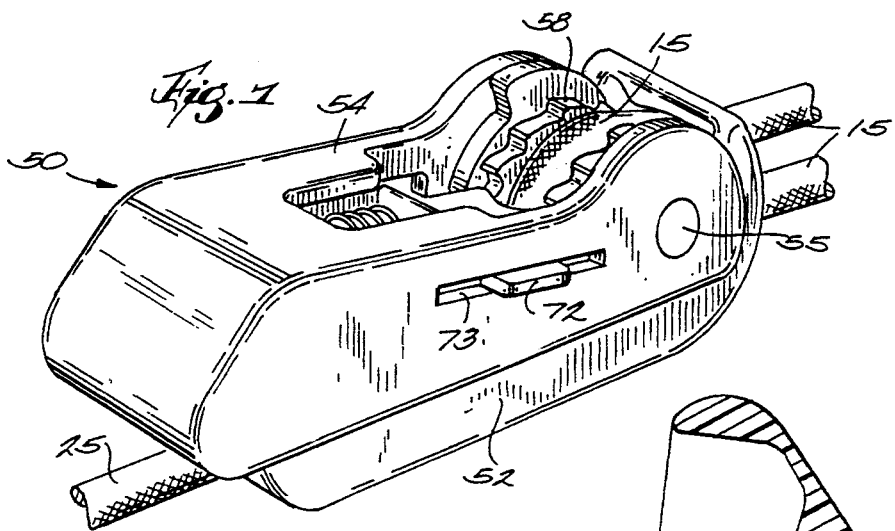
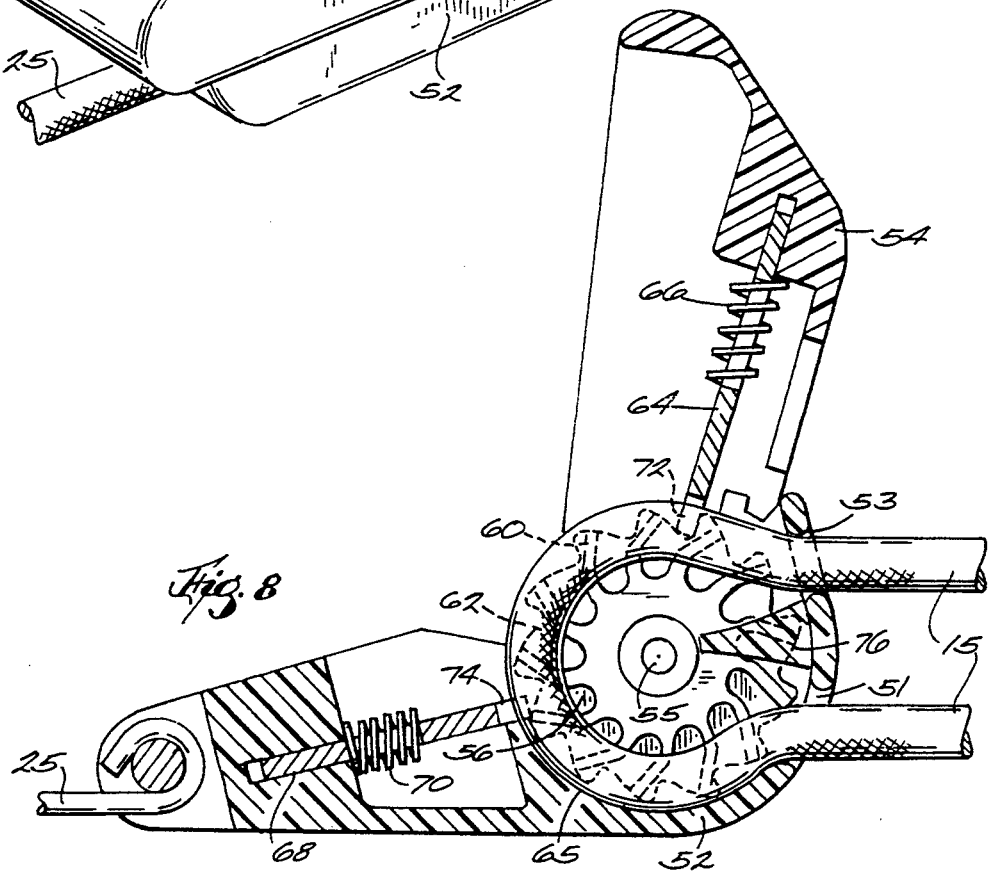
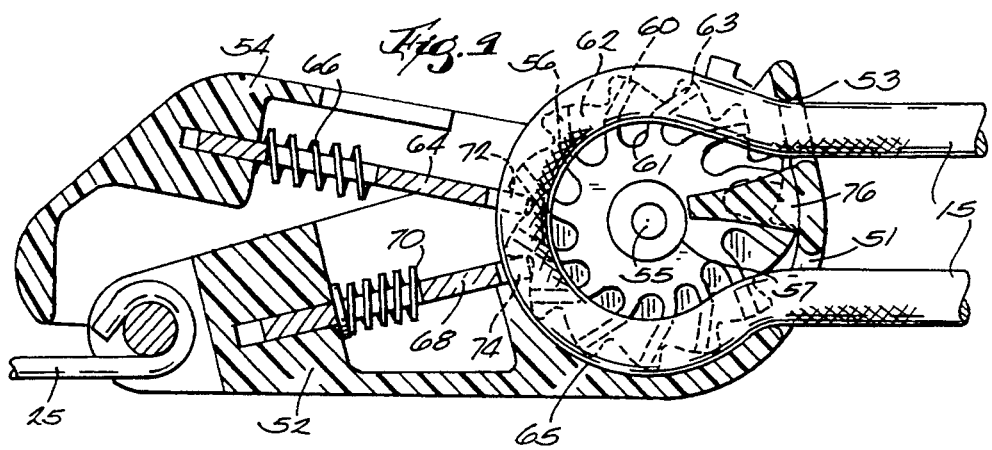

RATCHET PULLEY FOR TIGHTENING CORDS OR ROPES

This application is a continuation-in-part of copending application Ser. No. 07/743,192, filed Aug. 9, 1991, now abandoned.

BACKGROUND OF THE INVENTION

1. Field of the Invention

This invention relates to pulleys for tightening and tensioning ropes or cords having a ratchet mechanism to permit retaining the same under tension, and more particularly, to such a mechanism which employs a serrated pulley wheel or shears to secure a cord or rope which is reeved therein.

2. Background Art

Various ratcheting mechanisms have been heretofore used to tighten belts for such applications as tie down straps for securing a load on a vehicle, for boat mooring or anchor systems, tree seats or climbing aids, or other applications wherein it is desirable to be able to tighten a strap which subsequently can easily be released.

SUMMARY OF THE INVENTION

The invention comprises an improvement in the art of rope tightening mechanisms which utilize raised internal ridges or serrations in a pulley wheel or shears. More particularly, the invention relates to such a device which contains serrations that extend radially from the base of the sheave on each surface thereof but the ends of which are angled in order to grasp a rope or cord sheave thereover more firmly in one direction than the other. In accordance with the present invention, a sheave is rotatably located in a housing that contains a guiding surface for maintaining a rope reeved on the sheave in non-slipping contact with the sheave. A simple rope and sheave combination is thus provided that can serve as a tie-down mechanism for loads on a motor vehicle in which the rope does not vibrate loose as has occurred with prior art devices. The rope is kept in a locking position engaged with the sheave even when the rope is slack.

In accordance with one embodiment of the invention, the cord or rope is tensioned by pulling thereon by hand. In another embodiment of the invention the ratchet mechanism is provided with a pivoting lever in order to provide increased tensioning force on the rope or cord.

An important aspect and advantage of the present invention is the provision of a sheave which allows for easier release of the rope or cord but which still provides a secure gripping thereof in order to secure the tension of the rope. A further aspect of the invention is to provide ridges or serrations which are rounded and thus do not cause undue fraying of the rope or cord. A further aspect of the invention relates to the provision of a flat surface at the bottom of the sheave which does not cause undo wedging of the cord therein which prevents removal thereof.

Still a further aspect of the invention relates to providing a ratcheting sheave in which an end of a rope inserted thereon is accurately guided around the circumference of the sheave so that the entire circumference thereof comes into contact with the rope. A related aspect involves placement of the sheave within a housing that is provided with closely fitting surfaces that guide and force the rope into close contact with the sheave.

Briefly summarized, the invention provides a ratchet-type tensioning mechanism for a rope or cord having a rotatable sheave with faces having radially extending serrations. A housing, within which the sheave is rotatably mounted, has an opening for ingress of a rope or cord into the housing and around the sheave, and an opening for egress of the rope from the housing. A curved surface in the housing is closely fitting around the exterior of the sheave from the ingress opening and extending approximately one-half of the circumference of the sheave in the direction of rotation thereof. An opening for manual access to the sheave is located between the end of the curved surface and the opening for egress, which may be part of the same opening as the ingress opening. The curved surface causes the rope or cord to be forced into engagement with the sheave upon rotation thereof.

Preferably the sheave is provided with a plurality of serrations having alternating ridges and valleys that circumscribe the sheave, each of which has a radially extending portion extending outwardly from the base of the sheave, the outer end of each of the ridges being angled in the direction in which the sheave rotates when the ratchet mechanism is engaged, the ridges being positioned at regular intervals around the circumference of the sheave and being located so that a ridge on one face of the sheave faces a valley on the opposite face of the sheave. Preferably the ridges and valleys have rounded edges whereby a rope thereon does not become frayed. The device may include a ratcheting lever arm which engages the wheel and affords leveraged tensioning the rope. As noted above, the housing within which the sheave is fitted includes a curved continuous surface that forces a rope into contact with the sheave for approximately the first one-half revolution of the rope around the sheave from the point of entry of the rope into the sheave. The side of the housing on the rope exiting side thereof is provided with an opening to permit manual turning of the sheave. A further point of constriction that maintains the rope in the sheave is provided adjacent to the point of exit of the rope from the housing.

Various other aspects and advantages of the invention will become apparent in connection with the following detailed description and accompanying drawings wherein:

DRAWINGS

FIG. 1 is a perspective view of one embodiment of a rope tightening device of this invention;

FIG. 2 is a perspective view showing the parts of FIG. 1 disassembled for clarity;

FIG. 3 is a top view of the tightening device of FIG. 1 with the rope removed;

FIG. 4 is a cross-sectional view of one-half of the sheave of FIG. 3 taken along line 4—4;

FIG. 7 is a perspective view of a different embodiment of a rope tightening device of this invention;

FIG. 8 is a cross-sectional view through the longitudinal axis of the device of FIG. 7 showing the lever arm in the open position; and, FIG. 9 is a cross-sectional view through the longitudinal axis of the device of FIG. 7 showing the lever arm in the closed position.

DETAILED DESCRIPTION

Figure 5A:
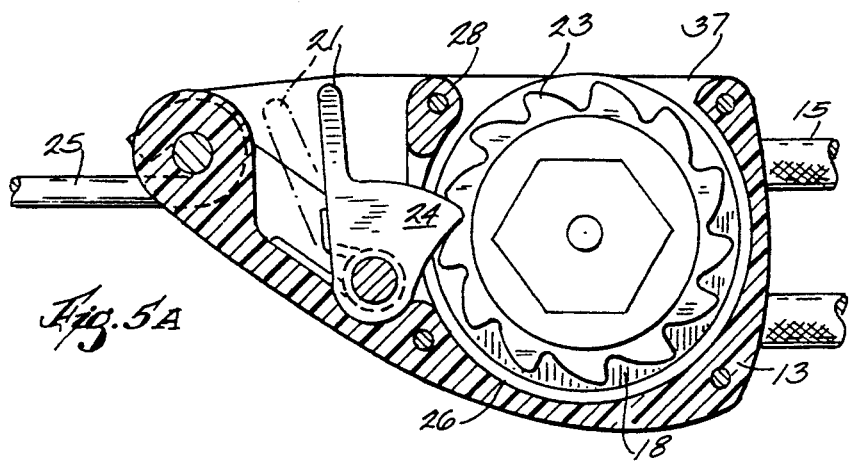
FIG. 5A is a cross-sectional view of the device of FIG. 1 taken along line 5A—5A.

Referring more specifically to the drawings, one form of tensioning mechanism 10, intended to be tightened by hand, is shown in FIGS. 1–6B. Device 10 includes a housing 12 formed from divisible halves 11 and 13 which are attached together as seen in FIG. 2 by conventional mechanical fasteners. Rotatably held within housing 12 is a sheave 14. Sheave 14, for ease of manufacture, is formed from halves 16 and 18. The inner face of each half of sheave 14 is provided with alternating ridges 17 and valleys 19. As best seen in FIG. 3, the ridges 17 on one half of the sheave are aligned with a valleys 19 on the other half to thereby form a tortuous path for engagement of a rope or cord 15. One of the halves 16 and 18 is provided with a threaded shaft 8 onto which a nut 9 can be threaded. The other half is preferably provided with a square or hexagonal head 20 integral therewith so that the parts can be assembled and disassembled using conventional wrenches or other tools. Shaft 8 can be provided with a configuration, such as a hexagonal cross-section, as illustrated, so that the halves of the sheave 14 will not rotate relative to each other. By providing twelve ridges as seen in FIG. 4 around the circumference of the sheave, a design is provided such that the respective ridges and valleys will be properly aligned regardless of the orientation of which the sheave half 16 is placed on shaft 8.

Housing 12 forms a chamber within which the sheave can rotate without being mounted on an axle connected to the chamber. Preferably, a shaft 8 is used to provide an axis for rotation. Indentations 6 are provided in the opposite sides 11 and 13 of the housing to receive and rotatably hold the opposite ends of shaft 8.

Opening 7 is of a restricted width such that the rope 15 is prevented thereby from passing around the outside of the sheave 14 thereby preventing wedging of the rope between sheave 14 and housing 12. The opening also guides the rope 15 around sheave 14 to ensure maximum contact thereof with the sheave 14. While a single opening 7 is shown for ingress and egress of rope 15, it will be apparent the two separated openings can be used, instead.

Figure 5B:
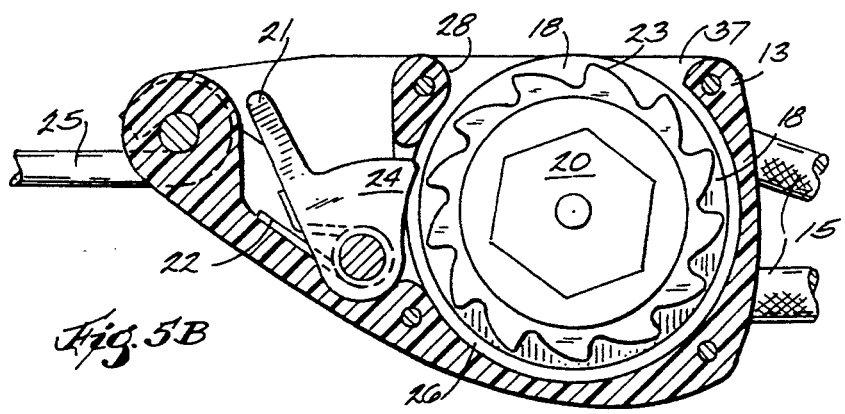
FIG. 5B is another cross-sectional view taken along line 5A—5A of FIG. 1 with the release mechanism in the released position.

The device is also provided with a ratchet mechanism 21 which is spring loaded by spring 22 to engage teeth 23 on a sprocket formed integrally with half 18 of the sheave. Projection 24 of ratchet mechanism 21 is urged by spring 22 into the spaces between the teeth 23 of the sheave. As seen in FIG. 5, a rope 15 reeved on sheave 14 is permitted to move only in the direction of the arrow when projection 24 engages sprocket 23. However, when the ratchet mechanism is pivoted as shown in FIG. 5B, the sheave is permitted to rotate in the counterclockwise direction thereby permitting loosening of rope 15.

The end of the device opposite rope 15 is secured by appropriate means such as a hook 25 to a fastening means 27 to be placed under tension. Means 27 can be, for example, a strap on a load secured to a motor vehicle, a strap on a platform for attachment to a pole or tree, or, for example, a fastening device for mooring watercraft.

Figure 6A:
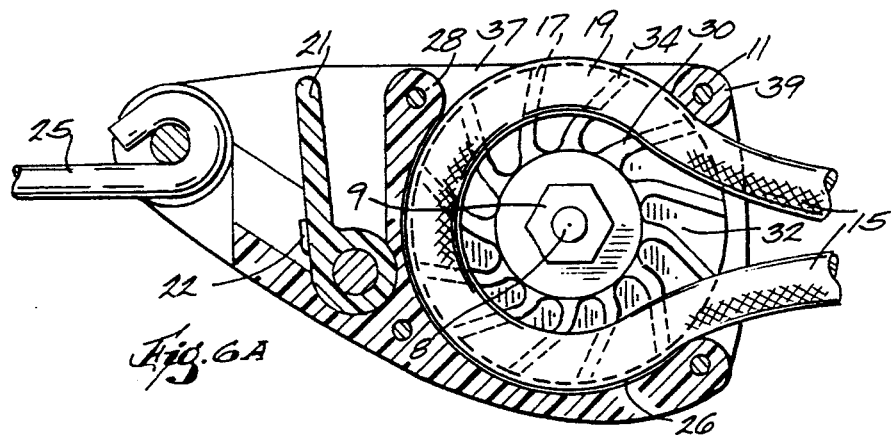
FIG. 6A is a cross-sectional view of the device of FIG. 1 taken along line 6A—6A.
Figure 6B:
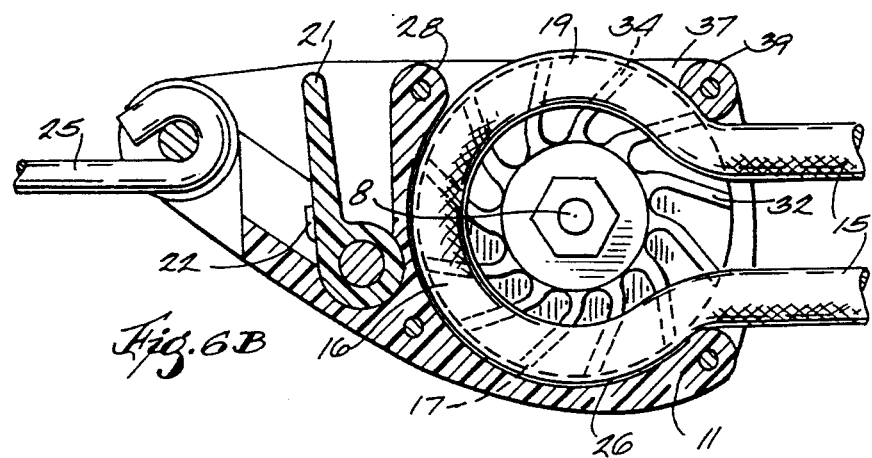
FIG. 6B is a further cross-sectional view taken along line 6A—6A but with the mechanism in the position to release the rope reeved therein.

In the illustrated embodiment one end of opening 7 provides a point of ingress of rope 15 into housing 12. A curved guiding surface 26 within the housing 12 receives the rope and guides and maintains or forces the end of the rope into close contact with sheave 14. As seen in FIGS. 2, 5 and 6, guiding surface 26 extends approximately one-half of the circumference of the sheave 14 and pushes the rope into contact with the sheave as it rotates, thereby preventing the rope from losing contact with sheave 14. Otherwise the rope, due to its "memory" tends to extend itself into a straight line.

As best seen in FIG. 4, each of the ridges 17 is provided at the inner end with a radially extending portion 30. Each of the ridges, however, is formed with a bend or "dog leg" 32 with the outer end 34 of each ridge 17 being angled in the direction in which the sheave rotates when the rope 15 is being tensioned. Another aspect of the invention is that the base of the sheave does not form a sharp "V" but rather has a flattened portion 35 which prevents rope 15 from being too tightly wedged in the sheave during tightening.

An opening 37 is provided in the side of housing 12 to provide manual access to sheave 14. Opening 37 extends from surface 28 to a post 39 that separates opening 37 from opening 7. Post 39 also serves to maintain rope 15 in sheave 14. Thus the combined effect of guiding surface 26 and post 39 is to provide a means extending about 75 per cent of the circumference of sheave 14 to force rope 15 into the opposed faces of the sheave. When installing rope 15 in ratchet 10, opening 37 permits manual rotation of the sheave and enables the end of the rope to be pushed, by thumb contact into the sheave 14 as the end of the rope is manually rotated past opening 37.

In the alternate embodiment of FIGS. 7–9, a housing 52 in pivotally connected to a lever arm 54 by means of a pin 55. Also mounted for rotation on pin 55 is a sheave 56. Sheave 56 is provided on each side with a ratchet wheel 58 mounted thereon or formed integrally therewith. Each of the faces of sheave 56 is provided with serrations in the form of alternating ridges 60 and valleys 62 around the circumference thereof. As in the case of the previously described embodiment, ridges 60 are formed with an inner sections 61 that extend radially outward from the hub of sheave 56 and outer sections 63 that are angled in the direction that sheave 56 is rotated when rope 15 is being tightened.

Lever arm 54 furnishes a means for applying greater tension on rope 15 than generally can be applied by hand. A ratchet latching plate 64 is provided in lever arm 54 to engage ratchet wheel 58. Plate 64 is urged against wheel 58 by means of spring 66. Plate 64 is formed with a concave inner surface that engages rope 15 and urges it into contact with sheave 56 as it is rotated by the plate 64. The rope 15 is thereby prevented from slipping on the surface of the sheave 56. Plate 64 can be pushed by hand out of contact with wheel 58 in order to loosen rope 15 when desired. A second plate 68 is provided to prevent rotation of wheel 58 while the rope 15 is being tightened by means of lever 54. Plate 68 is also urged against wheel 58 by means of a spring, 70. Tabs 72 and 74 are provided on plates 64 and 68, respectively to provide a means to slide the plates out of contact with wheel 58 in order to release rope 15. Suitable slot 73 can be provided in order to permit access to retract tab 72 when the lever 54 is in the closed position of FIGS. 7 and 9.

It has been found that the outer angled portions 63 of the ridges 60 tend to aggressively engage rope 15 to feed the same readily into the sheave when an end thereof is presented thereto as the sheave is rotated. However, since the inner portions 61 of the ridges are radially oriented, the rope can readily be loosened so the same can be removed without binding in the sheave. Flattened surface 35 also assists in such ready release of rope 15. In the preferred embodiment a wedge-shaped stripper element 76 is provided as seen in FIG. 8. Stripper 76 is mounted on the end of housing 52 and preferably has a curved end which engages the flat portion 57 at the center of sheave 56 to provide an additional bearing surface which prevents movement or bending of axle 55 under heavy loads. It also provides a means to positively strip the rope 15 from the sheave 56 so that the device 50 does not become immobilized by such wedging action.

While the invention has been described and illustrated in detail, it is to be understood that various modifications may be made within the spirit of the invention. Thus the scope thereof is limited only by the terms of the following claims.

What is claimed is:

1. A ratchet-type tensioning mechanism for a rope or cord comprising a rotatable sheave having a base and two opposed faces with a plurality of generally radially extending serrations having alternating ridges and valleys circumscribing each of said two opposed faces of said sheave, each of said ridges extending outwardly from the base of said sheave, said ridges being positioned at regular intervals around the circumference of said sheave, a housing within which said sheave is rotatably mounted, said housing having an opening for ingress of a rope or cord into said housing and around said sheave, and an opening for egress thereof from said housing, a curved guiding surface in said housing closely fitting around the exterior of said sheave from said ingress opening and extending approximately one-half of the circumference of said sheave in the direction of rotation thereof, an opening manual access to said sheave located between the end of said curved surface and said opening for egress, said curved surface causing said rope or cord to be forced into engagement with said sheave upon rotation thereof, and, a releasable ratchet mechanism which, when engaged, permits rotation of said sheave in one direction but not the other, and which, when released, permits free rotation of said sheave.

2. A device according to claim 1 wherein said ridges and valleys have rounded edges whereby a rope or cord reeved thereon does not become frayed.

3. A device according to claim 1 including a ratcheting lever arm which engages said wheel and affords leveraged tensioning of a rope reeved thereon.

4. A device according to claim 3 wherein a stripper element is positioned in contact with the base of said sheave to provide a means for removing the rope therefrom.

5. A device according to claim 4 wherein the end of the stripper in contact with the sheave is curved to match the contours of the base of the sheave.

6. A device according to claim 1 wherein the said base of said sheave contains a flat surface which prevents a rope reeved thereon to become tightly wedged into said base.

7. A ratchet according to claim 1 wherein said openings for ingress and egress of said rope comprise opposite ends of a single opening.

8. In a ratchet-type tensioning mechanism for a rope or cord which includes a rotatable sheave having two opposed faces with a plurality of radially extending serrations on said faces and a releasable ratchet mechanism which, when engaged, permits rotation of said sheave in one direction but not the other, and which, when released, permits free rotation of said sheave, the improvement which comprises a plurality of serrations having alternating ridges and valleys circumscribing each of said two opposing faces of said sheave, said ridges being positioned at regular intervals around the circumference of said sheave and being located so that a ridge on one base of said sheave faces a valley on the opposite face of said sheave, the outer end of each of said ridges being angled in the direction in which said sheave rotates when said ratchet mechanism is engaged, said sheave being mounted in a housing having a narrow opening which feeds the rope onto said sheave and a curved internal guiding surface around at least one half of the circumference of said sheave which maintains the rope in contact with said sheave and prevents wedging of the rope between the sheave and the housing and which feeds the rope around the circumference of said sheave.

9. A ratchet according to claim 8 wherein an opening is provided in the side of said housing to provide access for rotation of said sheave by hand.

* * * * *